US012782377B2

(12) United States Patent
Wei et al.

(10) Patent No.: US 12,782,377 B2
(45) Date of Patent: Nov. 3, 2026

(54) MOLDED COMPONENT

(71) Applicant: Sumitomo Wiring Systems, Ltd., Yokkaichi (JP)

(72) Inventors: Lin Wei, Yokkaichi (JP); Hiroyuki Koyano, Yokkaichi (JP); Yukitoshi Terasaka, Yokkaichi (JP); Toshinari Kobayashi, Yokkaichi (JP); Megumi Yamao, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 134 days.

(21) Appl. No.: 18/869,922

(22) PCT Filed: May 17, 2023

(86) PCT No.: PCT/JP2023/018447
§ 371 (c)(1),
(2) Date: Nov. 27, 2024

(87) PCT Pub. No.: WO2023/234032
PCT Pub. Date: Dec. 7, 2023

(65) Prior Publication Data

US 2025/0327830 A1 Oct. 23, 2025

(30) Foreign Application Priority Data

May 30, 2022 (JP) ................................ 2022-087440

(51) Int. Cl.
*G01P 1/02* (2006.01)
*G01D 11/24* (2006.01)
*G01P 3/481* (2006.01)

(52) U.S. Cl.
CPC ............ *G01P 1/026* (2013.01); *G01D 11/245* (2013.01); *G01P 1/02* (2013.01); *G01P 3/481* (2013.01)

(58) Field of Classification Search
CPC .. G01P 3/44; G01P 3/443; G01P 3/446; G01P 3/481; G01P 3/487; G01P 3/488; G01P 1/02; G01P 1/026; G01D 11/245
See application file for complete search history.

(56) References Cited

U.S. PATENT DOCUMENTS 4,994,739 A * 2/1991 Honda .................... G01P 1/026 324/207.2
2017/0153265 A1 6/2017 Yamamoto et al.
(Continued)

FOREIGN PATENT DOCUMENTS

JP 2006-112801 A 4/2006
JP 2007-121108 A 5/2007
(Continued)

OTHER PUBLICATIONS

WO 2022214373 and machine translation (Year: 2022).*
International Search Report, Application No. PCT/JP2023/018447, mailed Jul. 18, 2023. ISA/Japan Patent Office.

*Primary Examiner* — Steven L Yeninas
(74) *Attorney, Agent, or Firm* — Brooks Kushman P.C.

(57) ABSTRACT

A molded component 1 includes an internal component module including a first molded part, solder parts, and a second molded part. Lead wires include a first lead wire and a second lead wire. The first molded part includes a partition having a first face and a second face. The first lead wire has a first exposed section on the first face, and the second lead wire has a second exposed section on the second face. The first lead wire and the second lead wire are located at positions not overlapping with each other in a plan view from a direction in which the first face is oriented or a direction in which the second face is oriented. The solder parts include a first solder part located on the first face and a second solder part located on the second face.

8 Claims, 4 Drawing Sheets

(56) References Cited

U.S. PATENT DOCUMENTS

| | | | | |
|---|---|---|---|---|
| 2020/0292361 | A1* | 9/2020 | Yamamoto ........... | G01D 11/245 |
| 2023/0003559 | A1 | 1/2023 | Shimizu et al. | |

FOREIGN PATENT DOCUMENTS

| | | | |
|---|---|---|---|
| JP | 2019-207257 | A | 12/2019 |
| JP | 2020-169832 | A | 10/2020 |

* cited by examiner

MOLDED COMPONENT

CROSS-REFERENCE TO RELATED APPLICATIONS

This application is the U.S. national stage of PCT/JP2023/018447 filed on May 17, 2023, which claims priority of Japanese Patent Application No. JP 2022-087440 filed on May 30, 2022, the contents of which are incorporated herein.

TECHNICAL FIELD

The present disclosure relates to a molded component.

BACKGROUND

Vehicles such as automobiles are equipped with wheel speed sensors that measure the rotational speed of wheels. A device such as that described in JP 2017-096828A is known as this type of wheel speed sensor. The wheel speed sensor described in JP 2017-096828A includes a plurality of detector elements and a holder that holds the plurality of detector elements. The holder is injection molded with the detector elements held in a predetermined arrangement. The detector elements and the holder are covered by a resin molded part to form a molded body.

Here, in the molded component described in JP 2017-096828A, a plurality of terminals extend from the detector elements, which are inserts, when the resin molded part is formed. Further, each terminal is connected to a core wire by soldering. In such a case, adjacent terminals are close to each other, and solder parts for connecting the terminals to the respective core wires are also close to each other. When soldering is performed in this situation, soldering work needs to be performed so as to prevent adjacent solder parts from coming into contact with each other, making the soldering work difficult.

It is an object to provide a molded component that facilitates soldering work and prevents contact between adjacent solder parts.

SUMMARY

A molded component of the present disclosure includes: an internal component module including: at least one internal component including an electrical component body and a lead wire extending from the electrical component body; and a first molded part covering a portion of the internal component; an electrical conductor connected to the lead wire and connectable to another electrical component; a solder part connecting the lead wire to the electrical conductor; and a second molded part covering the internal component module, the electrical conductor, and the solder part, wherein the lead wire includes a first lead wire and a second lead wire, the first molded part includes a partition having a first face and a second face oriented in a direction opposite to a direction in which the first face is oriented, the first lead wire has a first exposed section exposed from the first molded part on the first face, the second lead wire has a second exposed section exposed from the first molded part on the second face, the first lead wire and the second lead wire are located at positions not overlapping with each other in a plan view from the direction in which the first face is oriented or the direction in which the second face is oriented, and the solder part includes: a first solder part located on the first face and connecting the first exposed section to the electrical conductor; and a second solder part located on the second face and connecting the second exposed section to the electrical conductor.

Advantageous Effects

According to the present disclosure, soldering work is facilitated, and contact between adjacent solder parts is prevented.

DETAILED DESCRIPTION OF PREFERRED EMBODIMENTS

Figure 1:
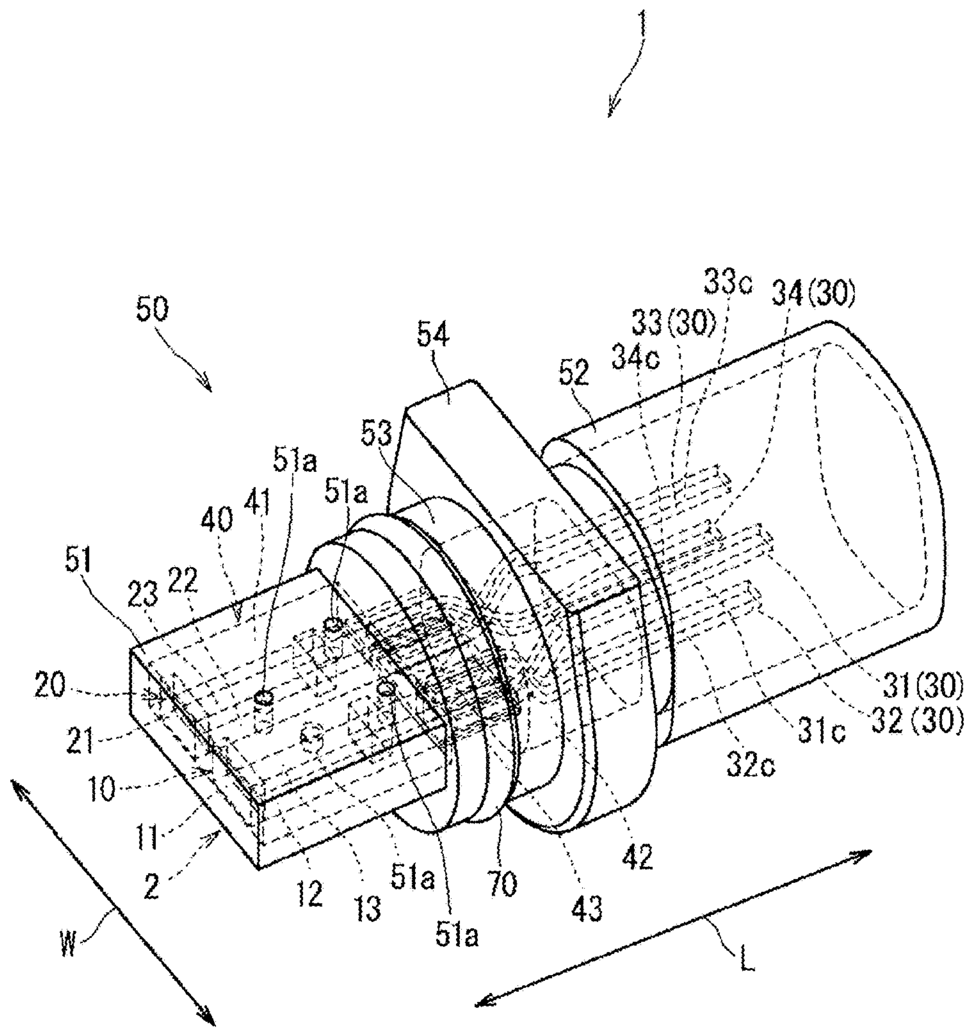
FIG. 1 is a perspective view of a molded component.

Firstly, modes for carrying out the present disclosure are listed and described.

A molded component of the present disclosure is as follows.

In a first aspect, a molded component includes: an internal component module including: at least one internal component including an electrical component body and a lead wire extending from the electrical component body; and a first molded part covering a portion of the internal component; an electrical conductor connected to the lead wire and connectable to another electrical component; a solder part connecting the lead wire to the electrical conductor; and a second molded part covering the internal component module, the electrical conductor, and the solder part, wherein the lead wire includes a first lead wire and a second lead wire, the first molded part includes a partition having a first face and a second face oriented in a direction opposite to a direction in which the first face is oriented, the first lead wire has a first exposed section exposed from the first molded part on the first face, the second lead wire has a second exposed section exposed from the first molded part on the second face, the first lead wire and the second lead wire are located at positions not overlapping with each other in a plan view from the direction in which the first face is oriented or the direction in which the second face is oriented, and the solder part includes: a first solder part located on the first face and connecting the first exposed section to the electrical conductor; and a second solder part located on the second face and connecting the second exposed section to the electrical conductor.

This molded component includes the solder part that includes the first solder part located on the first face and connecting the first exposed section to the electrical conductor, and the second solder part located on the second face and connecting the second exposed section to the electrical conductor. Thus, soldering work can be easily performed, and contact between adjacent solder parts is prevented. This prevents a short circuit between the first lead wire and the second lead wire due to contact between adjacent solder parts.

In a second aspect, in the molded component of the first aspect, the first lead wire may extend from the electrical component body included in the first internal component, and the second lead wire may extend from the electrical component body included in the second internal component.

With this molded component, the lead wire of the first internal component has the first exposed section on the first face, and the lead wire of the second internal component has the second exposed section on the second face. This prevents a short circuit between the lead wire of the first internal component and the lead wire of the second internal component.

In a third aspect, in the molded component of the first or the second aspects, the first lead wire may include a plurality of first lead wires, the second lead wire may include a plurality of second lead wires, and the first molded part may include a first separation wall separating the first lead wires from each other, and a second separation wall separating the second lead wires from each other.

With this molded component, the first molded part includes the first separation wall separating the first lead wires from each other, and the second separation wall separating the second lead wires from each other. This also prevents a short circuit between the lead wires located on the same surface.

In a fourth aspect, in the molded component of the second aspect, the first internal component and the second internal component may be arranged in mirror symmetry with respect to a virtual plane passing through an intermediate position between the respective electrical component bodies and extending along an extension direction of the lead wires.

Within this molded component, the first internal component and the second internal component part can be in the same orientation. This makes it easy to make electrical characteristics of the first internal component and the second internal component uniform. For example, if the first internal component and the second internal component are sensors, the first internal component and the second internal component can be in the same orientation relative to a detection target. Consequently, when the detection target is detected, the first internal component and the second internal component can be expected to output detection signals with similar output characteristics.

In a fifth aspect, in the molded component of any of the first through the fourth aspects, the first face may be recessed from the second face in the direction in which the second face is oriented as viewed in a cross section perpendicular to the extension direction of the lead wires.

With this molded component, the lead wire on the first face and the lead wire on the second face can be formed in a similar bent shape.

In a sixth aspect, in the molded component of any of the first through the fifth aspects, the first face may be recessed from the second face by an amount corresponding to a thickness of each of the lead wires in the direction in which the second face is oriented as viewed in a cross section perpendicular to the extension direction of the lead wires.

With this molded component, the lead wire on the first face and the lead wire on the second face can be formed in a more similar bent shape. Since the heights of the lead wires in the thickness direction can be made uniform, it is not necessary to make any of the lead wires have a bending angle different from those of the other lead wires. It is thus possible to suppress a bending load or the like applied more to any one of the lead wires than to the other lead wires.

In a seventh aspect, in the molded component of any of the first through the sixth aspects, the partition may have a first step between the first face and a back side of the second face, and a second step between the second face and a back side of the first face, the first step may have a corner having a chamfer shape, and the second step may have a corner having a chamfer shape.

With this molded component, the shape of the steps facilitates soldering work.

Specific examples of the molded component of the present disclosure are described below with reference to the drawings. Note that the present disclosure is not limited to these examples but is defined by the claims, and is intended to include all changes made within the meaning and scope equivalent to the claims.

Note that the drawings are schematic illustrations, and configurations may be omitted or simplified in the drawings as appropriate for convenience of description. The interrelationships in sizes and positions between components shown in different drawings are not necessarily described accurately and may be changed as appropriate. In not only cross-sectional views but also diagrams such as plan views, hatching may be used to facilitate understanding of the content of the embodiments.

In the following description, like constituent elements are assigned like reference numerals, and their names and functions are also the same. Therefore, detailed descriptions thereof may be omitted to avoid redundancy.

First Embodiment

Figure 2:
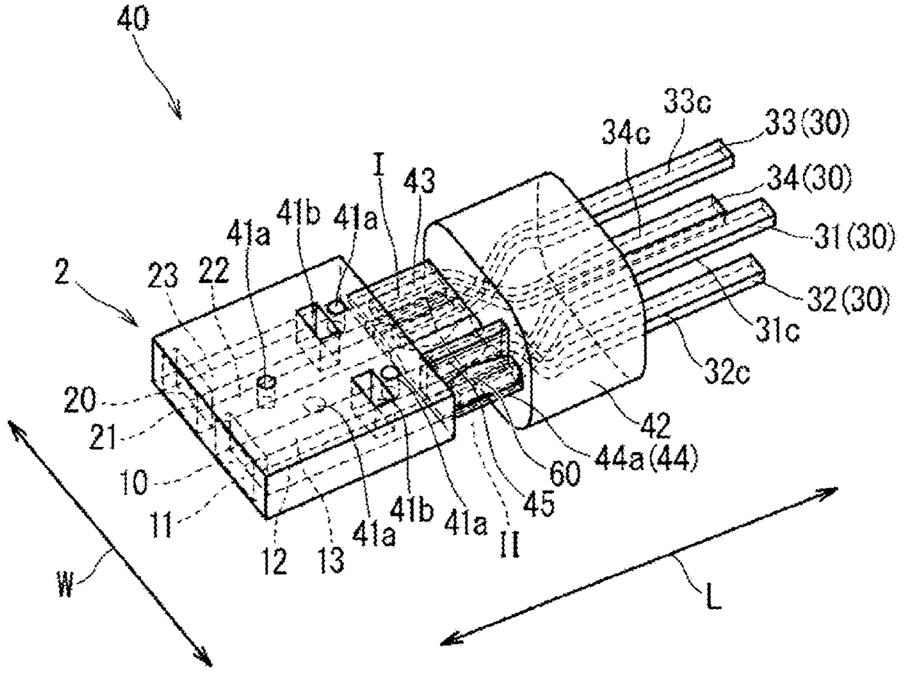
FIG. 2 is a perspective view of the molded component without a second molded part.
Figure 3:
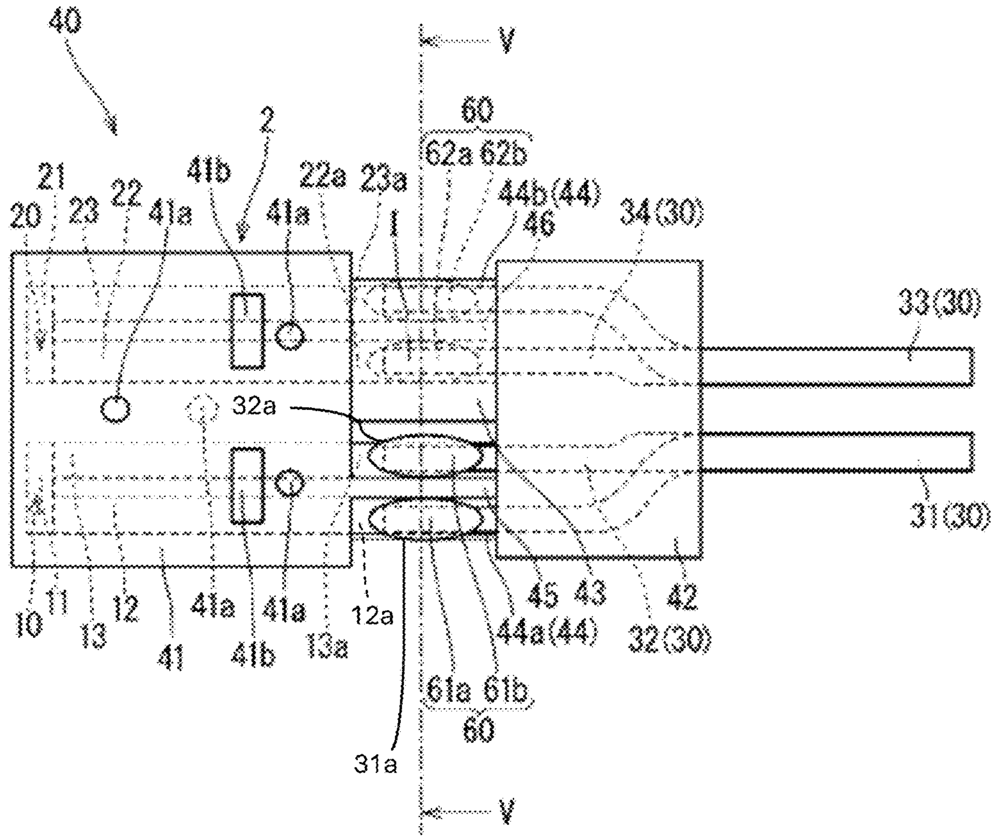
FIG. 3 is a plan view of the molded component without the second molded part.
Figure 4:
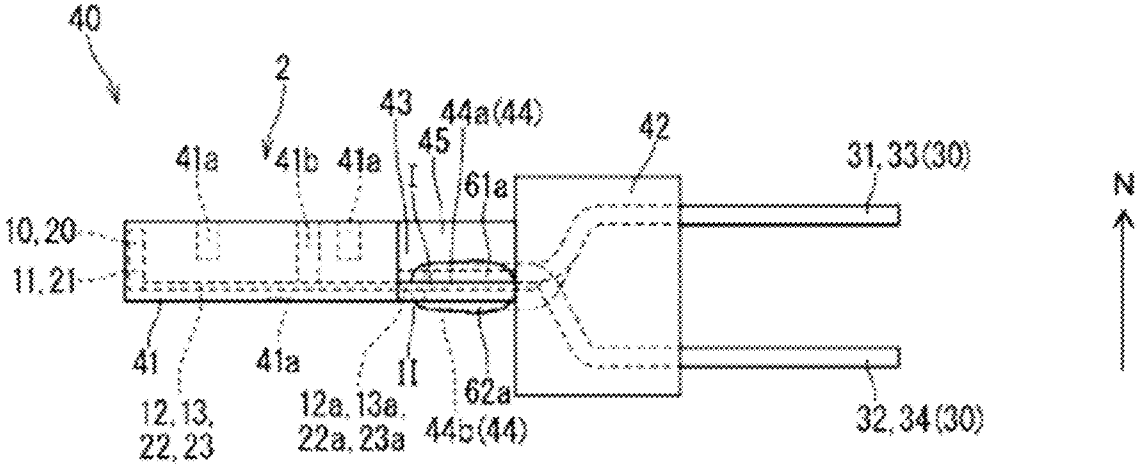
FIG. 4 is a side view of the molded component without the second molded part.

A molded component 1 related to the present embodiment will be described below. FIG. 1 is a perspective view of the molded component 1. FIG. 2 is a perspective view of the molded component 1 excluding a second molded part 50. FIG. 3 is a plan view of the molded component 1 excluding the second molded part 50. FIG. 4 is a side view of the molded component 1 excluding the second molded part 50. FIG. is a cross-sectional view showing a V-V cross section of FIG. 3. In the figures and the following description, L denotes the lengthwise direction of the molded component 1, and W denotes the widthwise direction thereof.

Configuration of Molded Component 1

The molded component 1 is used, for example, to measure the rotational speed of a vehicle tire. The molded component 1 detects, for example, magnetic field fluctuations due to a rotation of a detection target that rotates with the rotation of a tire. The molded component 1 includes an internal component module 2. The internal component module 2 includes at least one internal component (here, two internal components 10 and 20), and a first molded part 40 covering portions of the internal components 10 and 20. The internal components 10 and 20 have detector element bodies 11 and 21, which are electronic component bodies, and lead wires 12, 13, 22, and 23 extending from the detector element bodies 11 and 21. The molded component 1 also includes connection terminals 30 serving as electrical conductors that are connected to the lead wires 12, 13, 22, and 23 (although four lead wires are provided here, the number thereof is not specifically limited), solder parts 60 connecting the lead wires 12, 13, 22, and 23 to the connection terminals 30, and a second molded part 50 covering the internal component module 2, the connection terminals 30, and the solder parts 60. The connection terminals 30 as an electrical conductor is connectable to another electrical component.

Note that the present embodiment uses four lead wires 12, 13, 22, and 23 (two lead wires for each of the detector element bodies 11 and 21), but a configuration in which one or more lead wires are provided for each of the detector element bodies 11 and 21 may also be encompassed by the present disclosure.

Configuration of Internal Components 10 and 20

The internal component 10 includes a first internal component 10 and a second internal component 20 (the first and second internal components are collectively referred to as "internal component(s)"). As mentioned above, the first internal component 10 has a detector element body 11, which is an electronic component body, and (here, two) lead wires 12 and 13 extending from the detector element body 11. The two lead wires 12 and 13 are arranged side by side with a gap therebetween. The second internal component 20 has the same configuration as the first internal component 10. The second internal component 20 has a detector element body 21, which is an electronic component body, and (here, two) lead wires 22 and 23.

The first internal component 10 and the second internal component 20 are arranged in the widthwise direction W of the molded component 1. The four lead wires 12, 13, 22, and 23 extend parallel with each other in the lengthwise direction L of the molded component 1.

The detector element bodies 11 and 21 detect, for example, magnetic field fluctuations due to a rotation of a detection target that rotates with the rotation of a tire. The detector element bodies 11 and 21 may detect magnetic field fluctuations around the detector element bodies 11 and 21 that occur with a movement of a magnet attached to a rotor in a magnet encoder, for example. The detector element bodies 11 and 21 output electrical signals corresponding to such magnetic field fluctuations (wheel rotation speed). The detector element bodies 11 and 21 are, for example, disposed at different positions in the rotational direction of the detection target, and thus generate electrical signals at different timings. The electrical signals output from the detector element bodies 11 and 21 are transmitted to the connection terminals 30 via the lead wires 12, 13, 22, and 23. The electrical signals transmitted to the connection terminals 30 are input to another electrical component (e.g., a control unit or a control device).

The lead wires 12, 13, 22, and 23 include first lead wires 12 and 13 and second lead wires 22 and 23 (the first and second lead wires are collectively referred to as "lead wire(s)"). In the present embodiment, the first lead wires 12 and 13 are the lead wires 12 and 13 extending from the detector element body 11 of the first internal component 10. The second lead wires 22 and 23 are the lead wires 22 and 23 extending from the detector element body 21 of the second internal component 20. The first lead wires 12 and 13 and the second lead wires 22 and 23 each have, for example, a thin rectangular plate shape. The first lead wires 12 and 13 extend in parallel from the detector element body 11, and the second lead wires 22 and 23 extend in parallel from the detector element body 21. The detector element bodies 11 and 21 are adjacent to each other with a gap therebetween. The detector element bodies 11 and 21 are in the same orientation within the first molded part 40. Thus, the first lead wires 12 and 13 and the second lead wires 22 and 23 are parallel with each other as a whole.

Note that a plurality of (here, two) first lead wires 12 and 13 are provided. Also, a plurality of (here, two) second lead wires 22 and 23 are provided.

Figure 5:
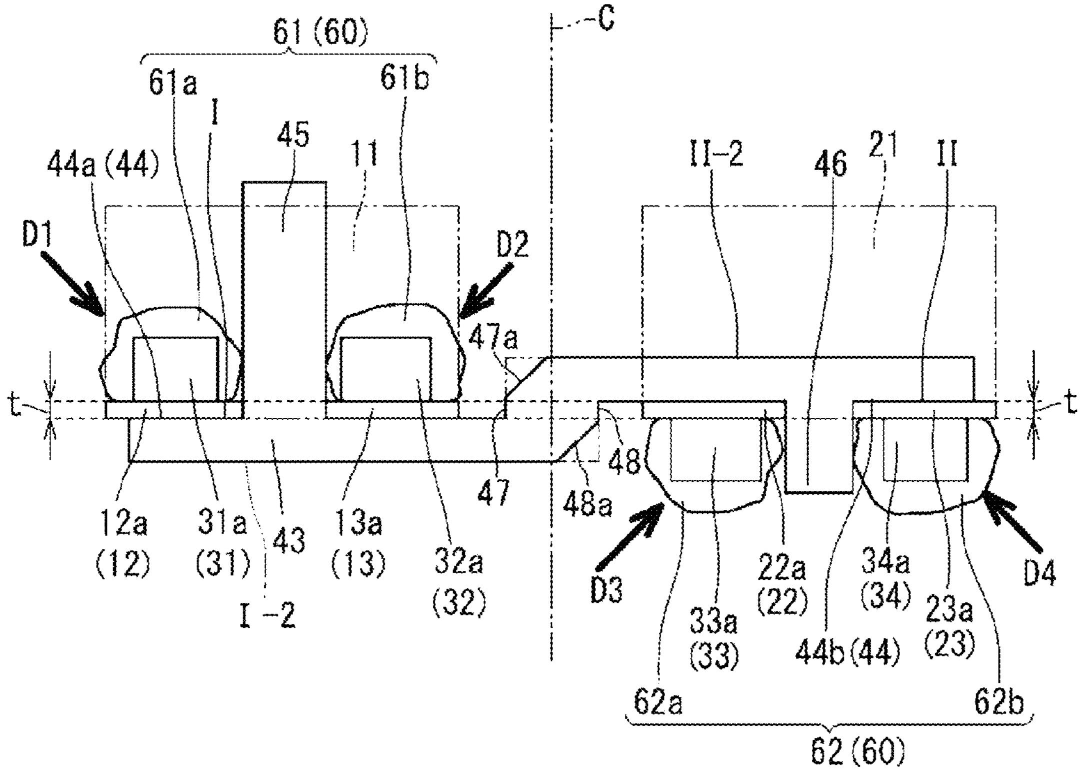
FIG. 5 is a cross-sectional view showing a V-V cross-section of FIG. 3.

As shown in FIGS. 3 to 5, the first lead wires 12 and 13 have first exposed sections 12*a* and 13*a*, respectively, which are exposed from the first molded part 40 on a first face I (which will be described later) of the first molded part 40. The first exposed sections 12*a* and 13*a* are leading end portions of the respective first lead wires 12 and 13. The first exposed sections 12*a* and 13*a* includes portions to be soldered. The first lead wires 12 and 13 are soldered and connected to the connection terminals 30 by the solder parts 60 at those portions to be soldered.

The second lead wires 22 and 23 have second exposed sections 22*a* and 23*a*, respectively, which are exposed from the first molded part 40 on a second face II (which will be described later) of the first molded part 40. The second exposed sections 22*a* and 23*a* are leading end portions of the respective second lead wires 22 and 23. The second exposed sections 22*a* and 23*a* includes portions to be soldered. The second lead wires 22 and 23 are soldered and connected to the connection terminals 30 by the solder parts 60 at those portions to be soldered.

As shown in FIG. 3, the first lead wires 12 and 13 and the second lead wires 22 and 23 are disposed at positions that do not overlap with each other in a plan view. The term "plan view" here refers to a plan view from a direction in which the first face I is oriented or a direction in which the second face II is oriented. The first face I and the second face II in the present embodiment are flat parallel faces. Thus, the first face I and the second face II are oriented in the same direction.

Configuration of Connection Terminals 30

The connection terminals 30 are connected to the first lead wires 12 and 13 and the second lead wires 22 and 23, and are connectable to the other electrical component.

The connection terminals 30 include four connection terminals 31, 32, 33, and 34 (the connection terminals 31, 32, 33, and 34 are collectively referred to as "connection terminal(s) 30"). The connection terminals 30 are made of, for example, a metallic material such as copper, a copper alloy, aluminum, an aluminum alloy, or stainless steel. The connection terminals 30 are formed of a conductive material, for example, by pressing a metal plate, for example. The connection terminals 30 are rigid to the extent that they can maintain their orientation in a constant shape.

The connection terminals 31, 32, 33, and 34 are connected to the lead wires 12, 13, 22, and 23, respectively. As shown in FIGS. 1 and 2, one end of each of the connection terminals 31, 32, 33, and 34 is exposed from the first molded part 40 to form exposed sections 31*a*, 32*a*, 33*a*, and 34*a*.

Here, the connection terminals 31 and 32 of the connection terminals 30 are described. As shown in FIG. 3, the exposed sections 31*a* and 32*a* of the connection terminals 31 and 32 have portions to be soldered. These portions to be soldered are connected to the aforementioned lead wires 12 and 13 by the solder parts 60. The connection between the connection terminals 33 and 34 and the lead wires 22 and 23 is the same as the connection between the connection terminals 31 and 32 and the lead wires 12 and 13, and a description thereof is accordingly omitted.

The connection terminals 31, 32, 33, and 34 have connector exposed sections 31*c*, 32*c*, 33*c*, and 34*c* exposed from the first molded part 40 and the second molded part 50. Specifically, the other ends of the connection terminals 31, 32, 33, and 34 on the side different from the exposed sections 31*a*, 32*a*, 33*a*, and 34*a* side are exposed from the first molded part 40 and the second molded part 50, and constitute the connector exposed sections 31*c*, 32*c*, 33*c*, and 34*c*. The connector exposed sections 31*c*, 32*c*, 33*c*, and 34*c* are connection sections for connection to a connector connectable to another electrical component. The molded component 1 itself thus has a configuration having a connector due to these connector exposed sections 31*c*, 32*c*, 33*c*, and 34*c*. This allows the molded component 1 itself to be directly connected to a connector extending from another electrical component (e.g., a control unit or a control device).

Solder Parts 60

The solder parts 60 connect the first lead wires 12 and 13 and the second lead wires 22 and 23 to the connection terminals 30 serving as an electrical conductor.

As shown in FIGS. 3 to 5, the solder parts 60 include first solder parts 61*a* and 61*b* and second solder parts 62*a* and 62*b* (the first solder parts 61*a* and 61*b* and the second solder parts 62*a* and 62*b* are collectively referred to as "solder part(s) 60"; the first solder parts 61*a* and 61*b* are collectively referred to as "first solder part(s) 61", and the second solder parts 62*a* and 62*b* are collectively referred to as "second solder part(s) 62"). The first solder parts 61 (61*a*, 61*b*) are located on the first face I. The first solder parts 61 (61*a*, 61*b*) connect the first exposed sections 12*a* and 13*a* to the connection terminals 30. More specifically, the first solder part 61*a* connects the first exposed section 12*a* to the connection terminal 31, and the first solder part 61*b* connects the first exposed section 13*a* to the connection terminal 32.

The second solder parts 62 (62*a*, 62*b*) are located on the second face II. The second solder parts 62 (62*a*, 62*b*) connect the second exposed sections 22*a* and 23*a* to the connection terminals 30. More specifically, the second solder part 62*a* connects the second exposed section 22*a* to the connection terminal 33, and the second solder part 62*b* connects the second exposed section 23*a* to the connection terminal 34.

Since the first solder parts 61*a* and 61*b* and the second solder parts 62*a* and 62*b* are disposed on different faces as described above, soldering work for the first solder parts 61*a* and 61*b* and soldering work for the second solder parts 62*a* and 62*b* can be performed on different faces. This facilitates the soldering work.

First Molded Part 40

The first molded part 40 has a head 41, a connection terminal holder 42, and a joint section 43 that joins the head 41 to the connection terminal holder 42. The first molded part 40 is made of, for example, resin. The first molded part 40 is a part formed by molding a resin material with the internal components 10 and 20 as inserts.

The head 41 covers the detector element bodies 11 and 21. The head 41 includes recesses 41*a* and inner through-holes 41*b* that extend from a surface of the first molded part 40 to the internal components 10 and 20.

As shown in FIG. 5, the first internal component 10 and the second internal component 20 are arranged in mirror symmetry with respect to a virtual plane C that passes through an intermediate position between the detector element bodies 11 and 21 and extends along the extension direction of the first lead wires 12 and 13 and the second lead wires 22 and 23. Note that the plane C is also perpendicular to the first face I and the second face II. With the above-described molded component 1, the first internal component 10 and the second internal component 20 are in the same orientation within the molded component 1, so that the orientations of the first internal component 10 and the second internal component 20 relative to a detection target can be made as uniform as possible. Consequently, when detecting the detection target, the first internal component 10 and the second internal component 20 are likely to output detection signals with similar output characteristics. This facilitates processing of the detection signals and improves the accuracy of detection of the detection target.

The head 41 of the first molded part 40 has a plurality of (here, three) recesses 41*a* on the first face I side, and at least one (here, one) recess 41*a* on the second face II side. The recesses 41*a* are portions into which leading ends of positioning pins for fixing the first molded part 40 is inserted when the second molded part 50 is molded. That is, the recesses 41*a* are portions into which the positioning pins of a mold device are inserted when molding is performed using the first molded part 40 as an insert. The recesses 41*a* are recesses that are open in the surface of the first molded part 40 but do not reach the surfaces of the internal components 10 and 20.

The head 41 of the first molded part 40 has a plurality of (here, two) inner through-holes 41*b* on the first face I side. The inner through-holes 41*b* are marks of positioning pins for fixing portions of the internal components 10 and 20 when the first molded part 40 is molded. When the first molded part 40 is removed from the mold, the inner through-holes 41*b* are formed as marks of the positioning pins. The inner through-holes 41*b* extend to the surfaces of the internal components 10 and 20, and portions of the surfaces of the internal components 10 and 20 are exposed within the inner through-holes 41*b*. In the present embodiment, for example, the positioning pins press and fix the area of the lead wires 12, 13, 22, and 23 of the internal components 10 and 20. The inner through-holes 41*b* are formed so as to expose portions of the lead wires 12, 13, 22, and 23. As a result, the lead wires 12, 13, 22, and 23, which are fixed by the positioning pins when the first molded part 40 is molded, are exposed to the outside of the first molded part 40 through the inner through-holes 41*b*. Similarly, holes are also formed on the second face II side as marks of holding parts for holding the internal components 10 and 20, but are omitted in the figures.

The connection terminal holder 42 holds portions of the connection terminals 30. The connection terminal holder 42 holds a plurality of (here, four) connection terminals 31, 32, 33, and 34 at fixed positions. The exposed sections 31*a*, 32*a*, 33*a*, and 34*a* and the connector exposed sections 31*c*, 32*c*, 33*c*, and 34*c* are thus held at fixed positions. As a result, the connector exposed sections 31*c*, 32*c*, 33*c*, and 34*c* are held at fixed positions suitable for connection with a connector of another electrical component. For example, the connector exposed sections 31*c*, 32*c*, 33*c*, and 34*c* are held in orientations parallel with each other and protruding in the same direction. Further, the exposed sections 31*a*, 32*a*, 33*a*, and 34*a* are held at fixed positions suitable for connection with the lead wires 12, 13, 22, and 23 (e.g., positions abutting the lead wires 12, 13, 22, and 23 on the opposite side to the joint section 43).

The joint section 43 serves as a partition 43 that includes the first face I and the second face II that is oriented in a direction opposite to the direction in which first face I is oriented. The partition 43 (joint section 43) also serves to join the head 41 to the connection terminal holder 42 such that the connection terminal holder 42 is held at a fixed position relative to the head 41. The partition 43 may be thinner than the head 41 and the connection terminal holder 42.

The partition 43 has a placement section 44 on which the first lead wires 12 and 13 and the second lead wires 22 and 23 are placed. The first face I of the partition 43 has a first placement surface 44*a* on which the first lead wires 12 and 13 are placed. The second face II of the partition 43 has a second placement surface 44*b* on which the second lead wires 22 and 23 are placed.

In the present embodiment, the normal directions (arrow N in FIG. 4) of the first placement surface 44*a* and the second placement surface 44*b* are the same. The lead wires 12 and 13 are placed on the first placement surface 44*a*, and the lead wires 22 and 23 are placed on the second placement surface 44*b*. Since the lead wires 12 and 13 are disposed on the first placement surface 44*a* and the lead wires 22 and 23 are disposed on the second placement surface 44*b*, the first solder parts 61*a* and 61*b* (see FIGS. 3 and 5) on the first lead wires 12 and 13 and the second solder parts 62*a* and 62*b* (see FIGS. 3 and 5) on the second lead wires 22 and 23 do not come into contact with each other. This prevents a short circuit between the first lead wires 12 and 13 and the second lead wires 22 and 23.

The first molded part 40 also includes a first separation wall 45 separating the lead wires 12 and 13 from each other, and a second separation wall 46 separating the second lead wires 22 and 23 from each other.

More specifically, the first separation wall 45 is disposed between the lead wires 12 and 13 to separate the lead wires 12 and 13 from each other. This first separation wall 45 prevents the first solder part 61*a* on the first lead wire 12 and the first solder part 61*b* on the first lead wire 13 from coming into contact with each other. In addition, the first lead wires 12 and 13 do not come into contact with each other either. This prevents a short circuit between the first lead wires 12 and 13.

Similarly, the second separation wall 46 is disposed between the second lead wires 22 and 23 to separate the second lead wires 22 and 23 from each other. This second separation wall 46 prevents the second solder part 62*a* on the second lead wire 22 and the second solder part 62*b* on the second lead wire 23 from coming into contact with each other. In addition, the second lead wires 22 and 23 do not come into contact with each other either. This prevents a short circuit between the second lead wires 22 and 23.

As shown in FIG. 5, the first face I is recessed from the second face II in the direction in which the second face II is oriented as viewed in a cross section perpendicular to the extension direction of the first lead wires 12 and 13 and the second lead wires 22 and 23. More specifically, the first face I is recessed from a back side of the second face II. In the thickness direction of the partition 43, the first face I is separated from the second face II in the direction in which the second face II is oriented. In the present embodiment, the first face I is recessed from the second face II in the direction in which the second face II is oriented by an amount corresponding to a thickness t of the first lead wires 12 and 13 (second lead wires 22 and 23).

Similarly, the second face II is recessed from the first face I in the direction in which the first face I is oriented as viewed in a cross section perpendicular to the extension direction of the first lead wires 12 and 13 and the second lead wires 22 and 23. More specifically, the second face II is recessed from a back side of the first face I. In the thickness direction of the partition 43, the second face II is separated from the first face I in the direction in which the first face I is oriented. In the present embodiment, the second face II is recessed from the first face I in the direction in which the first face I is oriented by an amount corresponding to the thickness t of the second lead wires 22 and 23 (first lead wires 12 and 13).

This arrangement of the first lead wires 12 and 13 and the second lead wires 22 and 23 can align the positions in the thickness direction of the lead wires (the first lead wires 12 and 13 and the second lead wires 22 and 23). Thus, a first internal component 10 and a second internal component 20 that have the same shape can be used. That is, the positions in the thickness direction of the lead wires (the first lead wires 12 and 13 and the second lead wires 22 and 23) can be aligned in the normal direction of the first face I (the normal direction of the second face II). It is not necessary to make any of the lead wires 12, 13, 22, and 23 have a bending angle different from those of the other lead wires. It is thus possible to suppress a bending load or the like applied more to any one of the lead wires than to the other lead wires. Further, it is not necessary either to make the first lead wires 12 and 13 have a shape different from the shape of the second lead wires 22 and 23 or to forcibly change their shapes.

As shown in FIG. 5, the partition 43 has a first step 47 between the first face I and a back side II-2 of the second face II. As mentioned above, the first face I is recessed from the second face II by the amount corresponding to the thickness t. The first step 47 of the present embodiment is perpendicular to the first face I and the second face II. Further, the first step 47 has a corner 47*a* having a chamfer shape.

The partition 43 also has a second step 48 between the second face II and a back side I-2 of the first face I. As mentioned above, the second face II is recessed from the first face I by the amount corresponding to the thickness t. Similar to the first step 47, the second step 48 is also perpendicular to the first face I and the second face II. Further, the second step 48 has a corner 48*a* having a chamfer shape.

Second Molded Part 50

As shown in FIG. 1, the second molded part 50 covers the internal component module 2, the connection terminals 30, and the solder parts 60. The second molded part 50 includes a head cover 51 covering the head 41 of the first molded part 40, a tubular section 52 that surrounds portions of the connection terminals 30, and a joint section 53 that joins the head cover 51 to the tubular section 52. The second molded part 50 also includes an annular protrusion 54 that protrudes outward from an outer periphery of the joint section 53.

The head cover 51 of the second molded part 50 has a plurality of (here, three) outer through-holes 51*a* on the first face I side of the first molded part 40, and at least one (here, one) outer through-hole 51*a* on the second face II side of the first molded part 40. The outer through-holes 51*a* are marks of positioning pins for fixing portions of the first molded part 40 when the second molded part 50 is molded. When the second molded part 50 is removed from a mold, the outer through-holes 51*a* are formed as marks of the positioning pins. The outer through-holes 51*a* extend to the surface of the first molded part 40, and portions of the first molded part 40 are exposed within the outer through-holes 51*a*. In the present embodiment, the positioning pins engage with the recesses 41*a* of the first molded part 40 to fix the first molded part 40. Thus, the recesses 41*a*, which are fixed by the positioning pins when the second molded part 50 is molded, are exposed to the outside of the second molded part 50 through the outer through-holes 51*a*.

The tubular section 52 surrounds the connector exposed sections 31*c*, 32*c*, 33*c*, and 34*c* of the connection terminals 30. The tubular section 52 and the connector exposed sections 31*c*, 32*c*, 33*c*, and 34*c* are formed in shapes suitable for engaging with a mating connector connected to another electrical component. For example, the mating connector has a plurality of mating terminal sections connectable to the connector exposed sections 31*c*, 32*c*, 33*c*, and 34*c*. Each mating terminal sections is formed, for example, in a columnar terminal shape. The mating connector has a housing section that holds the plurality of mating terminal sections at positions corresponding to the positions of the respective connector exposed sections 31*c*, 32*c*, 33*c*, and 34*c*. The tubular section 52 is formed in a tubular shape into which the housing section of the mating connector can be inserted. Thus, the tubular section 52 and the connector exposed sections 31*c*, 32*c*, 33*c*, and 34*c* are directly connected to the mating connector connected to another electrical component.

The joint section 53 is located between the head cover 51 and the tubular section 52. The joint section 53 covers the first exposed sections 12*a* and 13*a* and the second exposed sections 22*a* and 23*a* of the lead wires 12, 13, 22, and 23, the exposed sections 31*a*, 32*a*, 33*a*, and 34*a* of the connection terminals 31, 32, 33, and 34, and the solder parts 60. With this, the first lead wires 12 and 13, the second lead wires 22 and 23, the connection terminals 30, and the solder parts 60 are covered by the second molded part 50 and are not exposed to the outside of the molded component 1.

An O-ring 70 (see FIG. 1) is attached to a peripheral portion of the joint section 53 on the side closer to the head cover 51 than the annular protrusion 54. The O-ring 70 is an annular member made of an elastic material such as rubber. The contact between the O-ring 70 and another member having a shape corresponding to the O-ring 70 prevents a liquid from flowing, with the O-ring 70 as a boundary.

Soldering Work

FIG. 5 is a diagram illustrating the approaching direction of a soldering iron during soldering work performed on the solder parts 60.

As shown in FIG. 5, the first solder parts 61*a* and 61*b* connect the first exposed sections 12*a* and 13*a* of the first lead wires 12 and 13 and the exposed sections 31*a* and 32*a* of the connection terminals 31 and 32 (30) that are fixed by the first molded part 40. The second solder parts 62*a* and 62*b* connect the second exposed sections 22*a* and 23*a* of the second lead wires 22 and 23 and the exposed sections 33*a* and 34*a* of the connection terminals 33 and 34 (30) that are fixed by the first molded part 40. The first solder parts 61*a* and 61*b* (solder parts 60) and the second solder parts 62*a* and 62*b* (solder parts 60) are made of a metal material (solder) having a lower melting temperature than that of the lead wires 12, 13, 22, and 23 and the connection terminals 30 that are to be joined. In the present embodiment, the solder is melted by heating it with the soldering iron to approximately 250° C. to 350° C. The molten solder spreads around the connecting portions of the first exposed sections 12*a* and 13*a*, the second exposed sections 22*a* and 23*a*, and the exposed sections 31*a*, 32*a*, 33*a*, and 34*a*. The molten solder, in this spread state, solidifies again when cooled in the outside air.

Referring to FIG. 5, when, for example, the first exposed section 12*a* and the exposed section 31*a* are connected, the material of the solder part 60 (61*a*), namely solder, is disposed close to the first exposed section 12*a* and the exposed section 31*a*. The soldering iron approaches this solder in the direction of arrow D1. At this time, there is no member that would prevent the soldering iron from approaching the solder. This allows the soldering work using the soldering iron to be performed smoothly. In addition, the first separation wall 45 separates the first exposed section 12*a* and the exposed section 31*a* from the adjacent first exposed section 13*a* and exposed section 32*a*. Thus, the first solder part 61*a* is prevented from coming into contact with the first exposed section 13*a*, the exposed section 32*a*, and the first solder part 61*b* when the first solder part 61*a* spreads when melted. This prevents a short circuit between the first lead wires 12 and 13.

When, for example, the first exposed section 13*a* and the exposed section 32*a* are connected, the material of the solder part 60 (61*b*), namely solder, is disposed close to the first exposed section 13*a* and the exposed section 32*a*. The soldering iron approaches this solder in the direction of arrow D2. At this time, there is no member that would prevent the soldering iron from approaching the solder. The first exposed section 13*a* and the second exposed section 22*a* are adjacent to each other in the direction W. However, the partition 43 separates them from each other. Thus, the work of soldering the exposed section 32*a* to the first exposed section 13*a* and the work of soldering the exposed section 33*a* to the second exposed section 22*a* can be performed smoothly without worrying about mutual contact of the solder. Further, the first step 47 has a corner 47*a* having a chamfer shape. Therefore, the soldering iron can proceed in the direction of arrow D2 without being interfered with by the corner 47*a*. This facilitates the soldering work using the soldering iron. In addition, the first separation wall 45 separates the first exposed section 13*a* from the adjacent first exposed section 12*a*. Thus, the first solder part 61*a* for soldering the first exposed section 13*a* to the exposed section 32*a* is prevented from coming into contact with first exposed section 12*a*, the exposed section 31*a*, and the first solder part 61*a* when the first solder part 61*b* spreads when melted. This prevents a short circuit between the first lead wires 12 and 13 and prevents a short circuit between the first lead wire 13 and the second lead wire 22.

The case of connecting the second exposed section 22*a* to the exposed section 33*a* and the case of connecting the second exposed section 23*a* to the exposed section 34*a* are the same as the above-described case of connecting the first exposed section 12*a* to the exposed section 31*a* and the case of connecting the first exposed section 13*a* to the exposed section 32*a*. In the case of connecting the second exposed section 22*a* to the exposed section 33*a*, the soldering iron approaches in the direction of arrow D3. At this time, there is no member that would prevent the soldering iron from approaching the solder. Further, due to the effect of the partition 43 and the second separation wall 46, soldering work can be performed smoothly without worrying about mutual contact of the solder. In the case of connecting the second exposed section 23*a* to the exposed section 34*a*, the soldering iron approaches in the direction of arrow D4. At this time, there is no member that would prevent the soldering iron from approaching the solder. Further, due to the effect of the second separation wall 46, soldering work can be performed smoothly without worrying about mutual contact of the solder.

Effect of the Above-Described Embodiment

Next, examples of the effect of the above-described embodiment will be described. In the following description, the effect is described based on the specific configurations described as examples in the above embodiment, but may be substituted by other specific configurations described as examples herein, to the extent that the same effect is produced.

This substitution may be made between a plurality of embodiments. In other words, the configurations described as examples in different embodiments may be combined to produce the same effect.

The molded component 1 configured as described above includes: an internal component module 2 including: at least one internal component 10, 20 having a detector element body 11, 21 serving as an electrical component body and a lead wire 12, 13, 22, 23 extending from the electrical component body (detector element body 11, 21); and a first molded part 40 covering a portion of the internal component 10, 20; an connection terminal 30 serving as an electrical conductor connected to the lead wire 12, 13, 22, 23 and connectable to another electrical component; a solder part 60 connecting the lead wire 12, 13, 22, 23 to the electrical conductor (connection terminal 30); and a second molded part 50 covering the internal component module 2, the electrical conductor (connection terminal 30), and the solder part 60, wherein the lead wire 12, 13, 22, 23 includes a first lead wire 12, 13 and a second lead wire 22, 23, the first molded part 40 includes a partition 43 having a first face I and a second face II oriented in a direction opposite to a direction in which the first face I is oriented, the first lead wire 12, 13 has a first exposed section 12*a*, 13*a* exposed from the first molded part 40 on the first face I, the second lead wire 22, 23 has a second exposed section 22*a*, 23*a* exposed from the first molded part 40 on the second face II, the first lead wire 12, 13 and the second lead wire 22, 23 are located at positions not overlapping with each other in a plan view from the direction in which the first face I is oriented or the direction in which the second face II is oriented, and the solder part 60 includes: a first solder part 61 located on the first face I and connecting the first exposed section 12*a*, 13*a* to the electrical conductor (connection terminal 30); and a second solder part 62 located on the second face II and connecting the second exposed section 22*a*, 23*a* to the electrical conductor (connection terminal 30).

With this configuration, the first solder parts 61 and the second solder parts 62 are disposed on different faces, that is, the first face I and the second face II, respectively. This facilitates soldering work.

Since the partition 43 is provided to separate the first face I from the second face II, contact between the first solder part 61 and the second solder part 62 is prevented. Therefore, a short circuit between the first lead wire 13 and the second lead wire 22, which are adjacent to each other, is prevented without providing a separation wall between the first lead wire 13 and the second lead wire 22. Particularly, the first lead wire 13 and the second lead wire 22 are arranged on the inner side relative to the first lead wire 12 and the second lead wire 23, respectively, in the widthwise direction W of the molded component 1. This makes it unlikely for a soldering iron to approach the first lead wire 13 and the second lead wire 22 from the outer side. Thus, such an arrangement of the lead wires on the different faces is particularly effective in soldering work for the first lead wire 13 and the second lead wire 22.

With the above molded component 1, the internal component 10, 20 includes a first internal component 10 and a second internal component 20, the first lead wire 12, 13 extends from the electrical component body (detector element body 11) in the first internal component 10, and the second lead wire 22, 23 extends from the electrical component body (detector element body 21) in the second internal component 20.

With this configuration, the first lead wire 12, 13 extending from the electrical component body (detector element body 11) of the first internal component and the second lead wire 22, 23 extending from the electrical component body (detector element body 21) of the second internal component 20 are disposed on different faces (the first face I and the second face II). It is thus possible to prevent a short circuit between the first lead wire 12, 13, which extends from the electrical component body (detector element body 11) of the first internal component 10, and the second lead wire 22, 23, which extends from the electrical component body (detector element body 21) of the second internal component 20.

Further, with the above-described molded component 1, the first lead wire 12, 13 includes a plurality of (here, two) first lead wires 12 and 13, and the second lead wire 22, 23 includes a plurality of (here, two) second lead wires 22 and 23. The molded component 1 also includes a first separation wall 45 separating the first lead wires (the first lead wires 12 and 13) from each other, and a second separation wall 46 separating the second lead wires (the second lead wires 22 and 23) from each other.

This configuration prevents a short circuit between the first lead wires 12 and 13 or between the second lead wires 22 and 23 that are disposed on the same faces (the first face I or the second face II). Even though the first separation wall is provided, soldering work can be performed from the side (arrow D1 or D2) different from the first separation wall 45 relative to the first lead wires 12 and 13. The first separation wall 45 is thus not a member that interrupts soldering work. Thus, the effect of the first separation wall 45 on the difficulty in the soldering work is suppressed, while the first separation wall 45 suppresses a short circuit between the first lead wires 12 and 13.

With the above-described molded component 1, the first face I and the second face II are parallel with each other. The first internal component 10 and the second internal component 20 are arranged in mirror symmetry with respect to the virtual plane C passing through the intermediate position between the electrical component bodies (detector element bodies 11 and 21) and extending along the extension direction of the first lead wire 12, 13 and the second lead wire 22, 23.

With this configuration, the two internal components (the first internal component 10 and the second internal component 20) are arranged in mirror symmetry with respect to the virtual plane C passing through the intermediate position between the electrical component bodies (the detector element bodies 11 and 21), allowing the first internal component 10 and the second internal component to be in the same orientation within the molded component 1. That is, the orientations of the first internal component 10 and the second internal component relative to a detection target can be made as uniform as possible. Consequently, when detecting the detection target, the first internal component 10 and the second internal component are likely to output detection signals with similar output characteristics. This facilitates processing for the detection signals and improves the accuracy of detection of the detection target.

With the above-described molded component 1, the first face I is recessed from the second face II in the direction in which the second face II is oriented as viewed in a cross section (see FIG. 5) perpendicular to the extension direction of the first lead wire 12, 13 and the second lead wire 22, 23.

With this configuration, the first lead wire 12, 13 can be disposed at a position on the first face I that is recessed toward the second face II, thereby making the bending angles of the first lead wire 12, 13 extending from the electrical component body (the detector element body 11) gentle. This eliminates the need to unreasonably adjust the angle at which the first lead wire 12, 13 is pulled out from the electrical component body (the detector element body 11).

Preferably, the first face I is recessed from the second face II in the direction in which the second face II is oriented by the amount corresponding to the thickness t of the first lead wire 12, 13 as viewed in a cross section (see FIG. 5) perpendicular to the extension direction of the first lead wire 12, 13 and the second lead wire 22, 23.

This configuration allows the first lead wire 12, 13 to be disposed on the first face I at a position recessed from the second face II in the direction in which the second face II is oriented by the amount corresponding to the thickness t of the first lead wire 12, 13. Thus, the positions in the thickness direction of the first lead wire 12, 13 and the second lead wire 22, 23 can be aligned. The amount of bending of the first lead wire 12, 13 extending from the electrical component body (the detector element body 11) can be reduced. In addition, when, for example, the first internal component 10 and the second internal component 20 are provided, the first internal component 10 and the second internal component 20 are allowed to have the same shape.

Preferably, the second face II is recessed from the first face I in the direction in which the first face I is oriented as viewed in a cross section (see FIG. 5) perpendicular to the extension direction of the first lead wire 12, 13 and the second lead wire 22, 23. More preferably, the second face II is recessed from the first face I in the direction in which the first face I is oriented by the amount corresponding to the thickness t of the second lead wire 22, 23 in as viewed in a cross section (see FIG. 5) perpendicular to the extension direction of the first lead wire 12, 13 and the second lead wire 22, 23.

The effect achieved by this configuration is the same as that of the aforementioned configuration in which the first face I is recessed from the second face II in the direction in which the second face II is oriented, and the description thereof is accordingly omitted.

With the above-described molded component 1, the partition 43 has a first step 47 between the first face I and the back side II-2 of the second face II, and a second step 48 between the second face II and the back side I-2 of the first face I. The corner 47*a* between an end of the first face I, an end of the first face I, and an end of the back side II-2 of the second face II has a chamfer shape, and the corner 48*a* between an end of the second face II, an end of the second face II, and an end of the back side I-2 of the first face I has a chamfer shape. Note that the "chamfer shape" refers to a shape with a chamfered surface without angular portions. Here, the chamfered surface may be a flat or curved surface.

With this configuration, the corner 47*a* of the first step 47 having a chamfer shape supports soldering work for the first lead wire 12, 13. Further, the corner 48*a* of the second step 48 having a chamfer shape supports soldering work for the second lead wire 22, 23.

OTHER EMBODIMENTS

Figure 6:
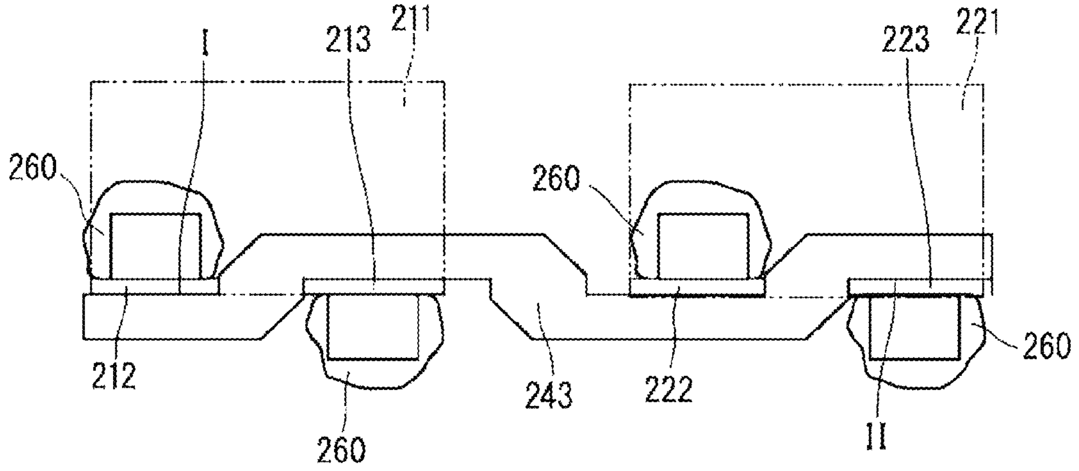
FIG. 6 is an illustrative diagram showing a cross section perpendicular to an extension direction of a lead wire according to another embodiment.

FIG. 6 is an illustrative diagram showing a cross section perpendicular to an extension direction of lead wires 212, 213, 222, and 223 according to another embodiment.

In the above-described embodiment, the first lead wires 12 and 13 are the lead wires 12 and 13 extending from the detector element body 11 of the first internal component 10, and the second lead wires 22 and 23 are the lead wires 22 and 23 extending from the detector element body 21 of the second internal component 20. Meanwhile, the embodiment shown in FIG. 6 has a different configuration.

In the embodiment shown in FIG. 6, a plurality of (here, two) lead wires 212 and 213 extending from a detector element body 211 include a first lead wire 212 and a second lead wire 213. Similarly, a plurality of (here, two) lead wires 222 and 223 extending from a detector element body 221 include a first lead wire 222 and a second lead wire 223. That is, the lead wires 212 and 222 are disposed on the first face I, and the lead wires 213 and 223 are disposed on the second face II. This arrangement also makes adjacent solder parts 260 arranged on different faces, preventing the solder parts 260 from coming into contact with each other. Note that, here as well, the first lead wires 212 and 222 and the second lead wires 213 223 are collectively referred to as "lead wire(s)".

When the adjacent first lead wires 212 and 222 and second lead wires 213 and 223 are arranged alternately in a direction parallel with the lead wires on the first face I and the second face II, the lead wires 212, 213, 222, and 223 are separated from each other by a partition 243. This eliminates the need for separation walls between the lead wires 212, 213, 222, and 223.

Figure 7:
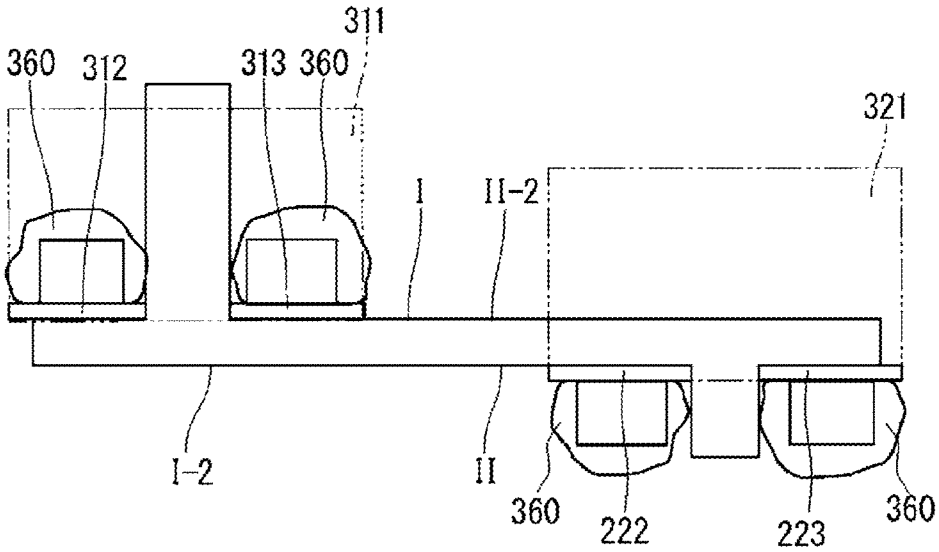
FIG. 7 is an illustrative diagram showing a cross section perpendicular to the extension direction of the lead wire according to another embodiment.

FIG. 7 is an illustrative diagram showing a cross section perpendicular to an extension direction of lead wires 312, 313, 322, and 323 according to yet another embodiment.

In the above-described embodiment, the first face I is recessed from the second face II in the direction in which the second face II is oriented as viewed in a cross section perpendicular to the extension direction of the first lead wires 12 and 13 and the second lead wires 22 and 23, and the second face II is recessed from the first face I in the direction in which the first face I is oriented as viewed in a cross section perpendicular to the extension direction of the first lead wires 12 and 13 and the second lead wires 22 and 23. Meanwhile, the embodiment shown in FIG. 7 has a different configuration.

In the embodiment shown in FIG. 7, the first face I is not recessed in the direction in which the second face II is oriented. No step is present between the first face I and the back side II-2 of the second face II, resulting in a flat state. Also, the second face II is not recessed in the direction in which the first face I is oriented. No step is present between the second face II and the back side I-2 of the second face II, resulting in a flat state. Since the first face I is not recessed in the direction in which the second face II is oriented, and the second face II is not recessed in the direction in which the first face I is oriented, the positions in the thickness direction of the first lead wires 312 and 313 are shifted from those of the second lead wires 322 and 323. However, this configuration also prevents adjacent solder parts 360 from coming into contact with each other. In addition, the absence of a recess simplifies the configuration of the first molded part 40.

The above-described embodiment employs a configuration with two internal components 10 and 20, but the number of internal components may alternatively be one or three or more. A configuration with a total of more than one lead wire may also be encompassed by the present disclosure. In the case of using one internal component, this one internal component may have a plurality of lead wires, which are arranged separately on the first face I and the second face II of the partition 43.

In the above-described embodiment, one internal component 10 (20) has two lead wires 12 and 13 (22 and 23). However, there is no limitation thereto. A configuration in which one internal component has one lead wire and a configuration in which one internal component includes three or more lead wires may also be encompassed by the present disclosure. In the case where one internal component has one lead wire, a configuration may be employed in which another internal component having one or more lead wires can be provided, and a total of two or more lead wires are provided.

In the above-described embodiment, two first lead wires 12 and 13 and two second lead wires 22 and 23 are provided, the first separation wall 45 separating the first lead wires 12 and 13 from each other and the second separation wall 46 separating the second lead wires 22 and 23 from each other are provided. However, there is no limitation thereto. A configuration in which a separation wall is provided between three or more first lead wires or three or more second lead wires may also be encompassed by the present disclosure.

In the above-described embodiment, the corner 47*a* of the first step 47 has a chamfer shape, and the corner 48*a* of the second step 48 also has a chamfer shape. However, there is no limitation thereto. A configuration in which the corner 47*a* of the first step 47 and/or the corner 48*a* of the second step 48 has a rounded shape may also be encompassed by the present disclosure.

The above-described embodiment employs the connection terminals 30 as electrical conductors connectable to another electrical component. However, there is no limitation thereto. A configuration that employs, for example, a common electric wire as an electrical conductor may also be encompassed by the present disclosure. In this case, a core wire as an electrical conductor that is exposed at an end of the electric wire may be soldered to a lead wire.

In the above-described embodiment, the first molded part 40 has the connection terminal holder 42 that holds portions of the connection terminals 30. However, there is no limitation thereto. A configuration in which the first molded part 40 has a partition that includes first and second faces may also be encompassed by the present disclosure.

In the above-described embodiment, the first molded part 40 is molded with the first internal component 10 and the second internal component 20 as inserts. However, there is no limitation thereto. The first internal component 10 and the second internal component 20 need not necessarily be used as inserts when the first molded part 40 is molded. In this case, a configuration without the inner through-holes 41*b* can be employed. For example, a first molded part with recesses into which the first internal component 10 and the second internal component 20 are fittable may be molded separately from the first internal component 10 and the second internal component 20, and the first internal component 10 and the second internal component 20 may be fitted into those recesses of the first molded part 40. In this case, the first molded part may be an assembly of a plurality of components joined together so as to be capable of accommodating therein the first internal component 10 and the second internal component 20.

MODIFICATIONS OF THE ABOVE-DESCRIBED EMBODIMENTS

In the embodiments described above, the properties of materials, materials, dimensions, shapes, relative positional relationships, or implementation conditions of each constituent element may also be described, but these are merely examples in all respects and are not limited to those described herein.

Thus, numerous variations and equivalents that are not illustrated are contemplated within the scope of the technology disclosed herein. For example, the scope of technology disclosed herein includes cases where at least one constituent element is modified, added, or omitted, and cases where at least one constituent element of at least one embodiment is extracted and combined with a constituent element of another embodiment.

The invention claimed is:

1. A molded component comprising:
an internal component module including:
at least one internal component including an electrical component body and a lead wire extending from the electrical component body; and
a first molded part covering a portion of the internal component;
an electrical conductor connected to the lead wire and connectable to another electrical component;
a solder part connecting the lead wire to the electrical conductor; and
a second molded part covering the internal component module, the electrical conductor, and the solder part,
wherein the lead wire includes a first lead wire and a second lead wire,
the first molded part includes a partition having a first face and a second face oriented in a direction opposite to a direction in which the first face is oriented,
the first lead wire has a first exposed section exposed from the first molded part on the first face,
the second lead wire has a second exposed section exposed from the first molded part on the second face,
the first lead wire and the second lead wire are located at positions not overlapping with each other in a plan view from the direction in which the first face is oriented or the direction in which the second face is oriented, and
the solder part includes:
a first solder part located on the first face and connecting the first exposed section to the electrical conductor; and
a second solder part located on the second face and connecting the second exposed section to the electrical conductor.

2. The molded component according to claim 1,
wherein the internal component includes a first internal component and a second internal component,
the first lead wire extends from the electrical component body included in the first internal component, and
the second lead wire extends from the electrical component body included in the second internal component.

3. The molded component according to claim 2,
wherein the first lead wire includes a plurality of first lead wires,
the second lead wire includes a plurality of second lead wires, and
the first molded part includes a first separation wall separating the first lead wires from each other, and a second separation wall separating the second lead wires from each other.

4. The molded component according to claim 3,
wherein the first internal component and the second internal component are arranged in mirror symmetry with respect to a virtual plane passing through an intermediate position between the respective electrical component bodies and extending along an extension direction of the lead wires.

5. The molded component according to claim 2,
wherein the first internal component and the second internal component are arranged in mirror symmetry with respect to a virtual plane passing through an intermediate position between the respective electrical component bodies and extending along an extension direction of the lead wires.

6. The molded component according to claim 5, wherein the first face is recessed from the second face in the direction in which the second face is oriented as viewed in a cross section perpendicular to the extension direction of the lead wires.

7. The molded component according to claim 6, wherein the first face is recessed from the second face by an amount corresponding to a thickness of each of the lead wires in the direction in which the second face is oriented as viewed in a cross section perpendicular to the extension direction of the lead wires.

8. The molded component according to claim 6, wherein the partition has a first step between the first face and a back side of the second face, and a second step between the second face and a back side of the first face, the first step has a corner having a chamfer shape, and the second step has a corner having a chamfer shape.

* * * * *